United States Patent [11] 3,584,964

| [72] | Inventor | Samuel Nejame, Jr. Medfield, Mass. |
|---|---|---|
| [21] | Appl. No. | 690,892 |
| [22] | Filed | Dec. 15, 1967 |
| [45] | Patented | June 15, 1971 |
| [73] | Assignee | International Equipment Company Needham Heights, Mass. |

[54] SPECTROPHOTOMETER, FLOW CELLS AND HOLDERS
2 Claims, 4 Drawing Figs.

[52] U.S. Cl................................................. 356/244,
   356/246, 250/218, 23/259, 73/425.4, 73/61
[51] Int. Cl........................................................ G01n 21/16
[50] Field of Search........................................ 356/244,
   246; 23/259; 250/218; 73/425.4, 61, 61.1

[56] References Cited
UNITED STATES PATENTS

| 2,490,345 | 12/1949 | Flatford et al. | 356/246 |
| 2,690,695 | 10/1954 | Coates | 356/246 |
| 2,864,279 | 12/1958 | Phifer | 250/43.5 X |
| 3,008,370 | 11/1961 | Uribe | 356/246 X |
| 3,097,928 | 7/1963 | Staunton | 356/246 X |
| 3,174,037 | 3/1965 | Demorest et al. | 250/43.5 |
| 3,246,559 | 4/1966 | Clifford, Jr. | 356/246 |
| 3,280,857 | 10/1966 | DeGrave, Jr. et al. | 356/246 X |
| 3,409,769 | 11/1968 | McKinney et al. | 250/43.5 X |
| 3,177,706 | 4/1965 | Shuman et al. | 73/61 |
| 3,400,575 | 9/1968 | Madden | 73/61 |

FOREIGN PATENTS

| 507,882 | 12/1954 | Canada | 250/218 |

OTHER REFERENCES

Holden et al., " A Variable Thickness Low Temperature Infrared Cell," J. opt. Soc. Am., 40(1), Nov. 1950, pp. 757- —760

Primary Examiner—Ronald L. Wibert
Assistant Examiner—R. J. Webster
Attorney—Abbott Spear ABSTRACT: Gradient analysis apparatus having a chamber provided with a light sensor and a light source directed at the sensor, a flow cell holder detachably supported in a predetermined position within the chamber, and a flow cell detachably held in a predetermined position by the holder and having a gradient passage intersected by a light beam with the gradient constituents being undisturbed in their passage through the light beam.

PATENTED JUN 15 1971 3,584,964
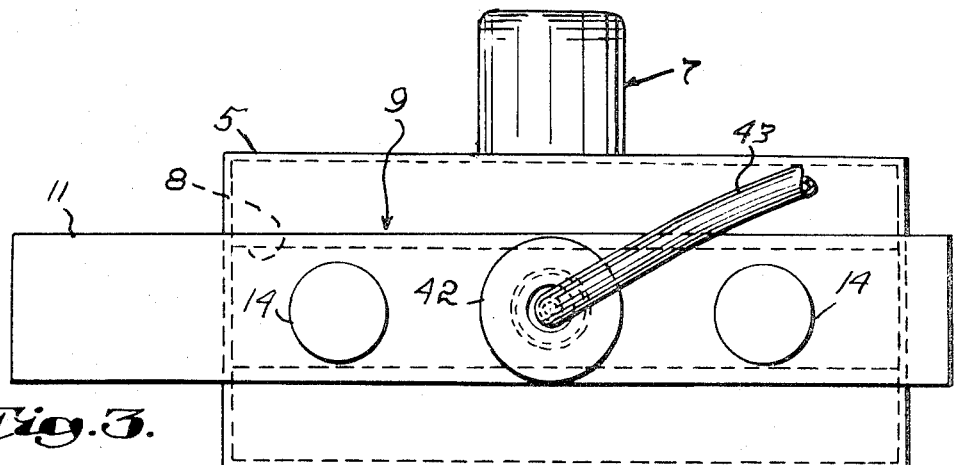
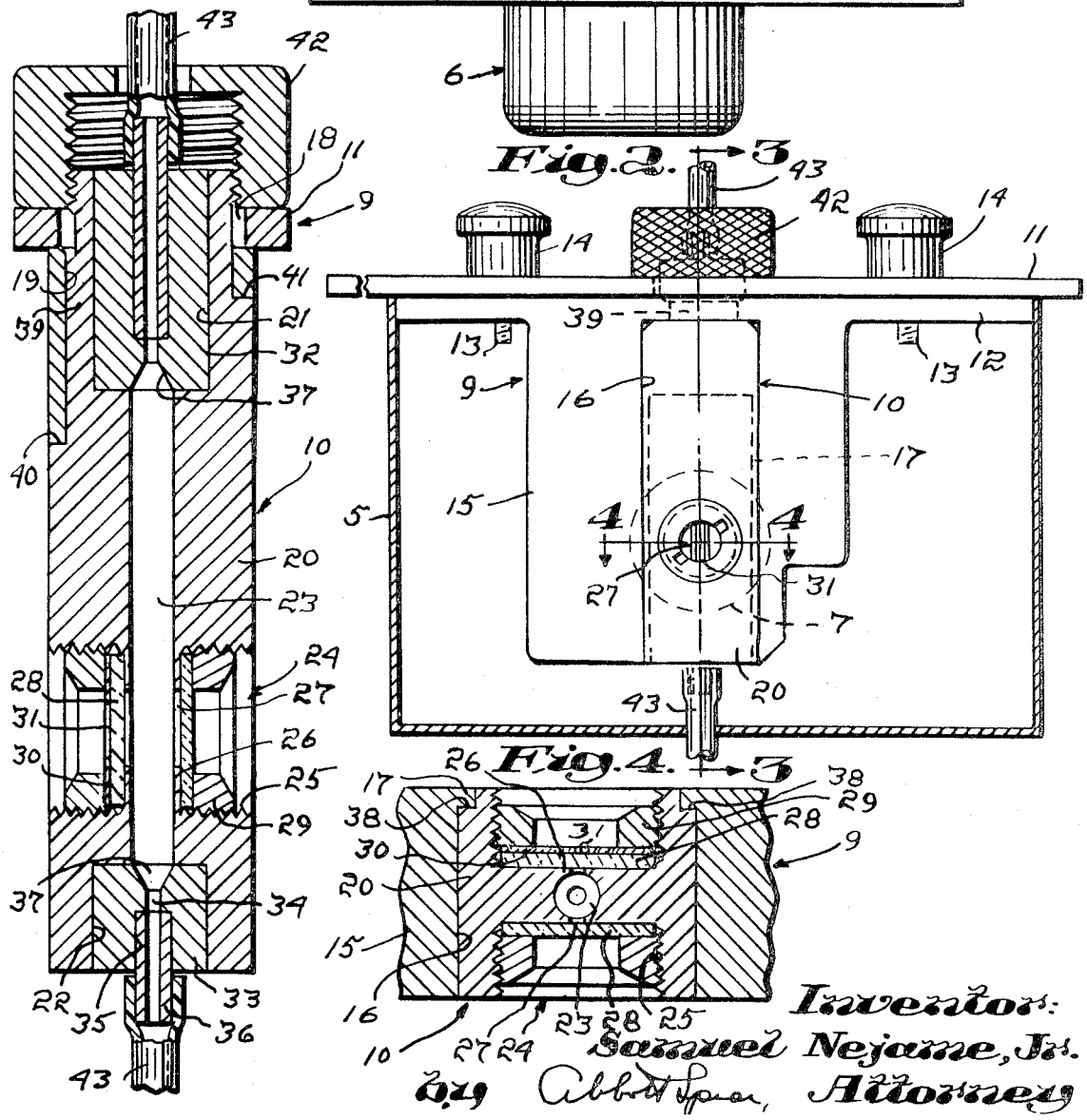
Inventor:
Samuel Nejame, Jr.
by Abbott Spear, Attorney

SPECTROPHOTOMETER, FLOW CELLS AND HOLDERS

The present invention relates to flow cells and to holders for supporting the flow cells in spectrophotometric apparatus.

In gradient analyses, a gradient effluent, by way of example is fed along a pathway intersecting a light beam directed to a light responsive sensor to yield information as to the light absorptivity of the particles within the effluent. This procedure requires that a flow cell be introduced into the fluid conduit, each flow cell having a light passage intersecting the fluid passage and the flow cell light paths range from 2 to 10 mm., for example. Errors in gradient analysis result if the flow through a flow cell is attended by turbulence, if a flow cell is not supported in the apparatus in a predetermined position relative to the light path, if the light passage is the source of detectable optical noise, i.e. nonparallel deflections within the chamber, and if the fluid passage entraps air bubbles.

An objective of the present invention is, accordingly, to provide apparatus for use in gradient analyses in which a flow cell having end ports in communication with the gradient passage and a light passage intersecting the gradient passage is secured to a holder in a predetermined position and the holder is itself removably attached to the apparatus in a predetermined position relative to the light path between the light source and the light responsive sensor. The gradient passage extends as a straight vertical passage through the cell with the conduit sections connected thereto being without any change in direction that would cause turbulence within the cell.

It will be appreciated that such analytical work is usually predicated on a flow cell whose gradient passage is of a diameter greater than that of the gradient conduit into which it is connected. Where changes in the cross-sectional area of the gradient passage through the flow cell are abrupt at its ends or in the zone of the intersection of the light and gradient passages, sufficient turbulence results to limit the accuracy of the analysis to an undesirable extent.

In accordance with the invention, each flow cell consists of a body having a gradient passage of substantial length with ports at its ends, either one of which may be the inlet or the outlet, to which ports appropriate sections of the gradient conduit are connected. The gradient passage is intersected by a light passage including diametrically opposed threaded sockets each of a depth leaving a thin web between it and the gradient passage with a window sealed in each socket and with each web having a central opening, the openings being in a plane inclusive of the axis of the gradient passage. With this construction, the slot edges are sufficiently thin to avoid interference of the flow of the liquid through the light path, the light path including a slit of a predetermined width interposed between the light source and the gradient passage, conveniently in a disc located in the appropriate socket, the disc being sufficiently thin to avoid detectable optical noise.

When the flow cell passage is of a diameter greater than that of the gradient conduit, the junctions between the gradient passage and the inlet and outlet therefor tapers outwardly to the diameter of the gradient passage, the diameter of the ports being related to the diameter of the gradient passage to prevent back pressure that would cause turbulence.

It will be appreciated that each such flow cell must be supported vertically in the chamber in a particular position relative to the light path in order to ensure accurate analysis. Such a position requires not only that the slit and the axis of the fluid passage be in a plane inclusive of the light sensor and the light source but also that it be in a particular position vertically in that plane.

Another objective of the invention is, accordingly, to provide a holder that will enable a flow cell to be entered into a chamber between the light source and the sensor and to be supported in a desired position relative thereto, the vertical position of the flow cell being established by the engagement of a support extending as a holder flanges for engagement with the chamber marginally of its entrance and its position in a horizontal plane being established by the upper part of its chamber-entering portion being dimensioned to fit snugly the chamber entrance. The holder also includes means detachably securing a flow cell thereto in a predetermined position.

Yet another objective of the invention is to provide a flow cell and holder combination in which the cell and holder have complemental shoulders which, when interengaged, establish the proper cell position together with means releasably locking the flow cell to the holder in that position.

In the accompanying drawings, there is shown an illustrative embodiment of the invention from which these and other of its objectives, novel features, and advantages will be apparent.

In the Drawings:

FIG. 1 is a top plan view of a flow cell supported by a holder in a chamber between a light source and a light sensor, FIG. 2 is a vertical section taken transversely of the chamber on the light sensor side thereof, FIG. 3 is a section, on a substantially increased scale, taken approximately along the indicated lines 3–3 of FIG. 2, and FIG. 4 is a fragmentary section, on the scale of FIG. 3, taken approximately along the indicated lines 4–4 of FIG. 2.

In the drawings, the chamber 5 of gradient analysis apparatus is shown as having a light responsive sensor, generally indicated at 6, to which light is directed from a generally indicated light source 7 in a conventional manner. The chamber 5 has an entrance slot 8 in its upper surface extending transversely of the light path to enable a holder, generally indicated at 9 with an attached flow cell, generally indicated at 10, to be supported within the chamber 5 in a predetermined position.

The holder 9 has a support 11 attached to its upper portion 12 by screws 13 provided with knobs 14, the upper portion 12 being shaped and dimensioned to so fit the entrance slot 8 as to be held by its margins against lateral movements in any direction. The support 11 is dimensioned relative to the entrance slot 8 to overlie its margins thus to seat on the top of the chamber 5 when the holder has been entered therein to a predetermined extent.

When the holder 9 is operatively positioned, it blocks the light path except for its vertical slot 16 which opens through its bottom edge with its opening through the holder face that is to be disposed towards the light source 7 being shorter and narrower than the opening through the opposite face and establishing a marginal flange 17. The support 11 has a hole 18 overlying a passage 19 in the holder 9 opening downwardly into the upper end of slot 16.

The flow cell 10 has a body portion 20 of rectangular cross section provided with sockets 21 and 22 in its ends and a cylindrical passage 23 effecting communication between them. A generally indicated light passage 24 intersects the passage 23 between its ends and is shown as somewhat closer to the socket 22 than to the socket 21. The light passage 24 includes threaded sockets 25, each of a depth leaving a thin web 26 between it and the passage 23 and each web 26 has a vertical slot 27 opening through it. Each socket 25 has a window 28 seated and sealed therein as by an annular nut 29 threaded therein, there being a disc 30 in the socket of each flow cell holder on the side of the cell 10 that is to be disposed towards the light source 7, each disc 30 having a slit 31 of predetermined width and extending diametrically thereof and disposed in a plane inclusive of the axis of the flow cell passage 23.

Inserts 32 and 33 are sealed in the sockets 21 and 22, respectively, and as these are identical, except for their length, the same reference numerals are used to indicate their corresponding parts. Each insert has a conduit portion 34 of a diameter less than that of the passage 23 and enlarged as at 35 at its outer end to receive one end of a tubular fitting 36 whose inside diameter is shown as the same as that of the bore 34. At its inner end, each passage 33 is outwardly tapered as at 37 to the diameter of the passage 23.

The distance between the faces of the flow cell 10 through which the light passage 24 opens is equal to the thickness of the chamber-entering portion of the cell holder 9. The width of the flow cell 10 is equal to that of the slot 16 and the face of the flow cell 10 that is to be disposed towards the light source 7 has marginal rabbets 38 thus to enable that face to be flush with the corresponding face of the holder 9 when the thus defined shoulders are seated against the shoulders provided by the flanges 17 of holder 9.

The flow cell 10 has a neck 39 dimensioned to pass through the hole 18 and the passage 19 and providing shoulders 40 and 41. The upper end of the cell neck 37 extends above the support 11 when the flow cell 10 is in position and it is anchored by a cap 42 threaded on the neck 39 until it seats on the support 11, the shoulders 40 and 41 then being drawn tightly against the upper edges of the slot 16 and the flange 17.

The ends of tubing sections 43 are secured to the fittings 36 and as the flow cells 10 are always in a predetermined position when attached to the holder 9 and as the holders 9 are vertically supported always in the same position in the chamber 5, each flow cell 10 always has the same relation to the light path between the light source and the sensor. In practice, both sections of the tubing are disposed to avoid any change in direction that would cause turbulence within the cell.

From the foregoing, it will be apparent that each flow cell 10 is always secured to a holder 9 in a predetermined position and that each holder 9, when in use, is always supported in a predetermined position in the chamber 5. It should also be noted that each web 26, marginally of its slot, is typically in the neighborhood of 0.012 of an inch or less in thickness and that the width of the slot 27 therein is at least 0.062 of an inch while the slit 31 in the disc is narrower, its width being, for example, in the order of 0.032 of inch whereby the light path is shielded from any shoulders regardless of the fact that they are of minimum extent. As a consequence, no important disturbance occurs as the gradients flow vertically past the light passage whether the flow be upwardly or downwardly, and as the disc is sufficiently thin, say 0.010 of an inch, detectable noise is eliminated.

Flow cells in accordance with the invention enable accurate analyses to be made with substantially higher flow rates than have hithertofore been possible making them particularly well suited for use in conjunction with zonal centrifuges whose flow rates are typically in the range of 0—80 ml. per minute. Typical dimensions of the light path length of flow cells are from 2—10 mm. with port dimensions in the range of from 0.070 to 0.156 of an inch for zonal uses and in the range of from 0.030 to 0.070 of an inch for use in conjunction with horizontal bucket centrifuges.

In practice, the cells 10 are formed from Delrin, an acetal resin, a product of E.I. duPont de Nemours, as this plastic has many desirable features such as machinability, inertness to a wide range of chemicals, minimal water absorptivity, and a degree of resilience such that windows may be sealed and tightly seated against their webs without the necessity of using separate seals.

I claim:

1. A member for holding a flow cell, having a threaded upper end, in a chamber between the light source and the light sensor of gradient analysis apparatus, the chamber having a downwardly opening entrance slot, said cell-holding member including a support to overlie the margins of said entrance slot and a depending, chamber-entering portion the upper part of which fits said entrance slot, said depending portion including a vertical, cell-receiving slideway opening through its bottom end and in a position to intersect the light path, the upper end of said slideway including seat portions, said upper part and said support having aligned holes extending therethrough for the threaded end of the flow cell, and a nut threaded on said end for use in clamping the flow cell against said seat portions 2. The cell holding member of claim 1 in which the support is a separate element and there are means detachably attaching the support to the chamber-entering portion.